United States Patent [19]

Blomqvist

[11] Patent Number: 4,646,437

[45] Date of Patent: Mar. 3, 1987

[54] CUTTING TOOLS

[75] Inventor: Berthold Blomqvist, Lammhult, Sweden

[73] Assignee: Steelform Invent AB, Lammhult, Sweden

[21] Appl. No.: 699,184

[22] Filed: Feb. 7, 1985

[30] Foreign Application Priority Data

Feb. 17, 1984 [DE] Fed. Rep. of Germany ... 8404854[U]

[51] Int. Cl.⁴ .......................................... B27B 21/00
[52] U.S. Cl. .................... 30/166 A; 30/294; 30/317
[58] Field of Search .......... 30/317, 246, 166, 166 A, 30/287, 294

[56] References Cited

U.S. PATENT DOCUMENTS

| | | | |
|---|---|---|---|
| 68,109 | 8/1867 | Porter | 30/317 |
| 79,700 | 7/1868 | Stark | 30/317 |
| 518,649 | 4/1894 | Mason | 30/246 X |
| 802,290 | 10/1905 | Holmes | 30/166 |
| 803,953 | 11/1905 | Wright | 30/246 |
| 814,153 | 3/1906 | Myer et al. | 30/294 X |
| 928,018 | 7/1909 | Barnard | 30/317 |
| 948,231 | 2/1910 | Libby | 30/317 |
| 973,582 | 10/1910 | Swegles | 30/166 X |
| 1,177,024 | 3/1916 | Dragos | 30/166 |
| 1,224,194 | 5/1917 | Miller | 30/166 A |
| 1,310,904 | 7/1919 | Carter | 30/166 A |
| 2,431,235 | 11/1947 | Flaa | 30/166 X |
| 3,158,933 | 12/1964 | Davis | 30/294 X |
| 3,241,236 | 3/1966 | Capps | 30/294 |
| 3,303,562 | 2/1967 | Booth | 30/166 |

*Primary Examiner*—Jimmy C. Peters
*Attorney, Agent, or Firm*—Browdy and Neimark

[57] ABSTRACT

The present invention relates to a cutting tool for prunning or cutting branches, wood plants and bushes, comprising a J-shaped tool body (1) and a handle (2). Secured to the tool body is a cutting blade (4,10) arranged in the opening presented between the two leg sections (6,7) of the J-body. The cutting blade extends diagonally over this opening. A further cutting blade (10,4) or one of the leg sections (6,7) is arranged opposite the cutting surface of the first cutting blade and serves as an anvil surface. When using the tool to prune or cut a branch for example, the tool is placed with the inside of the longer leg section against the branch and is pulled downwardly so as to draw the branch in between the two leg sections of the tool, whereupon the branch is severed. In this way a branch or the like can be pruned or cut with a single, powerful continuous movement. The tool may also include on the end thereof a cutting blade (14) and/or an externally arranged saw blade (14', 18).

1 Claim, 51 Drawing Figures

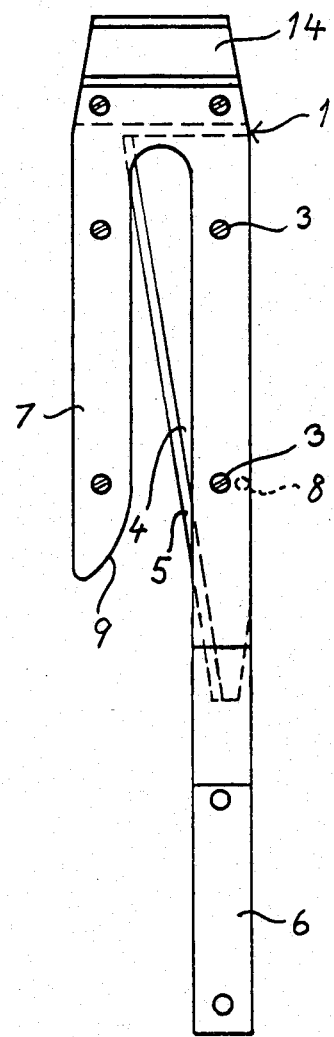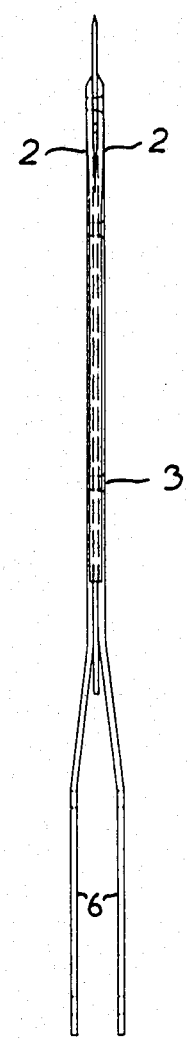

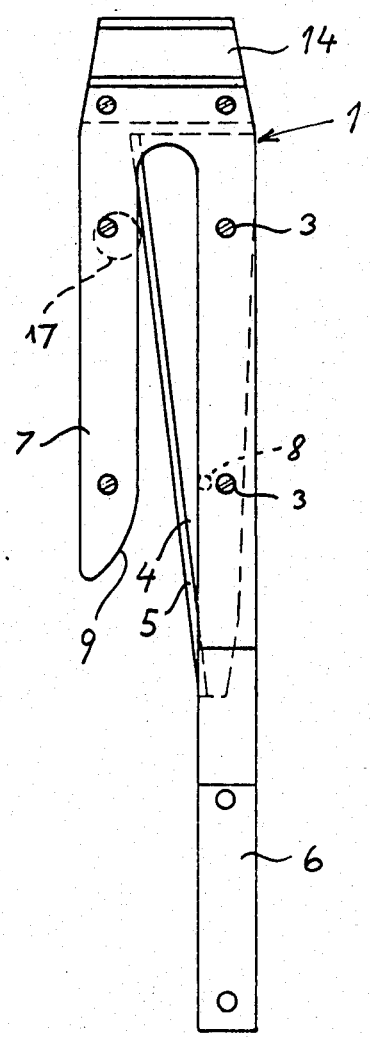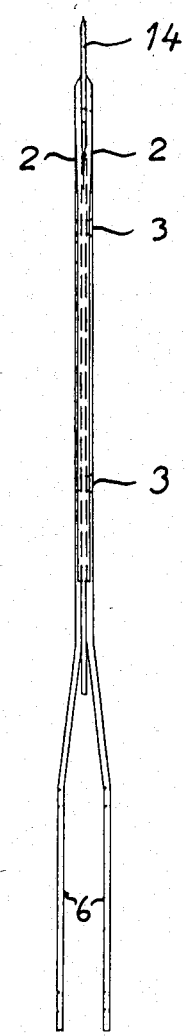

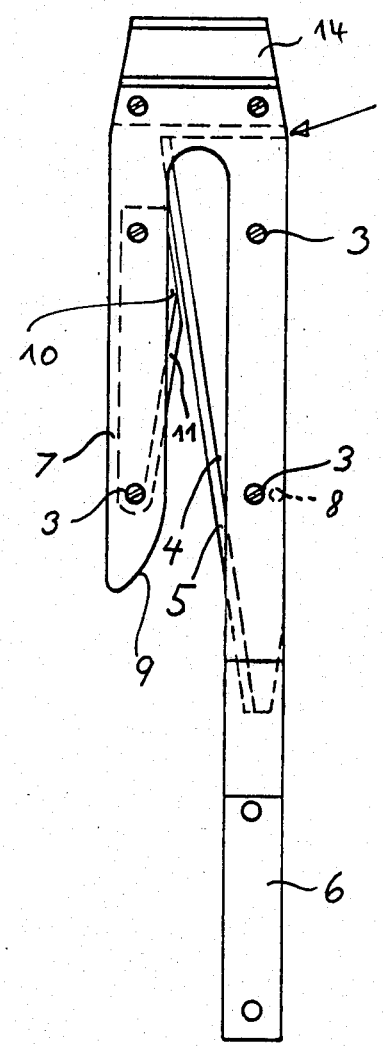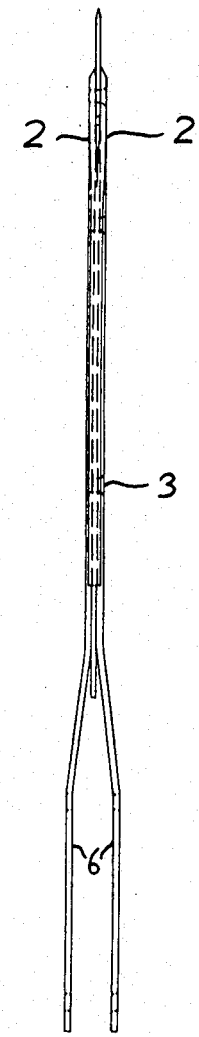

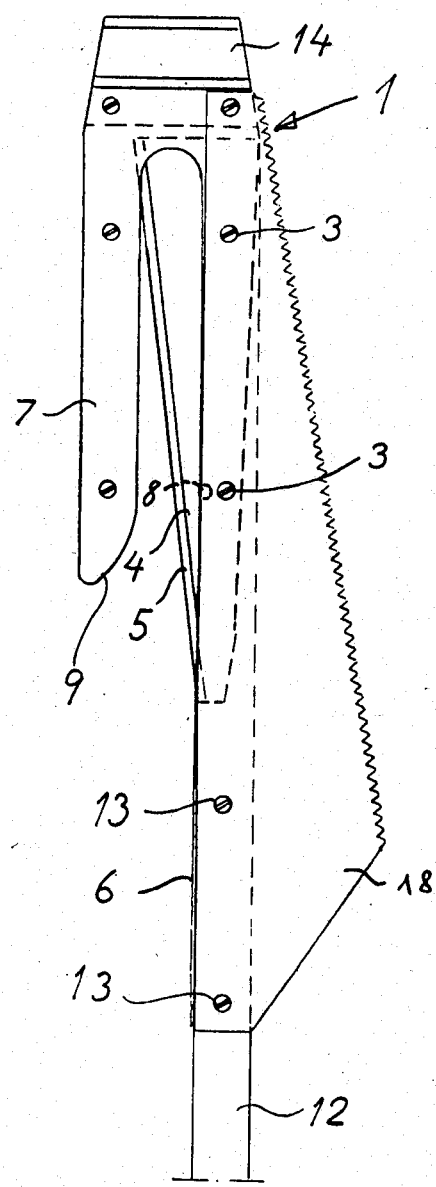
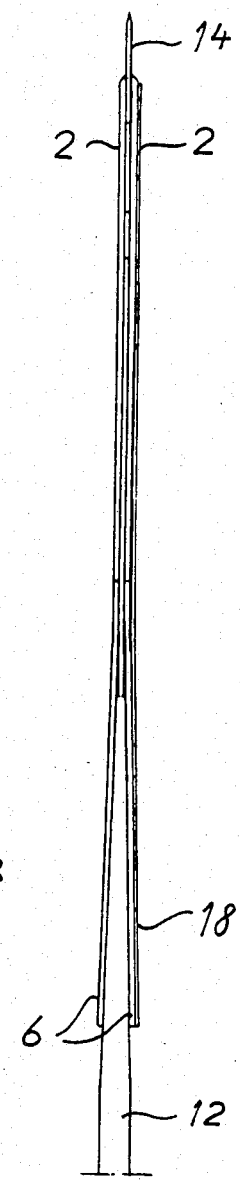
FIG.1e   FIG.1ee

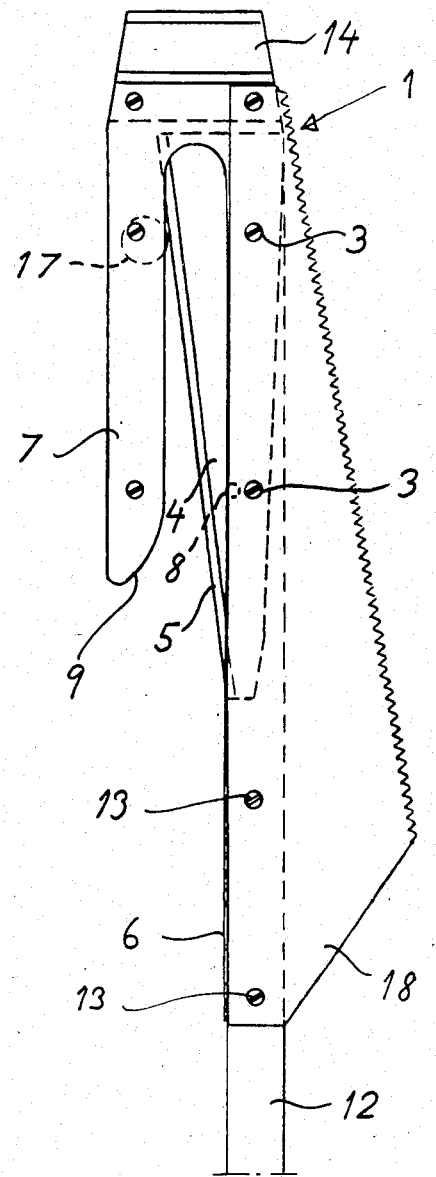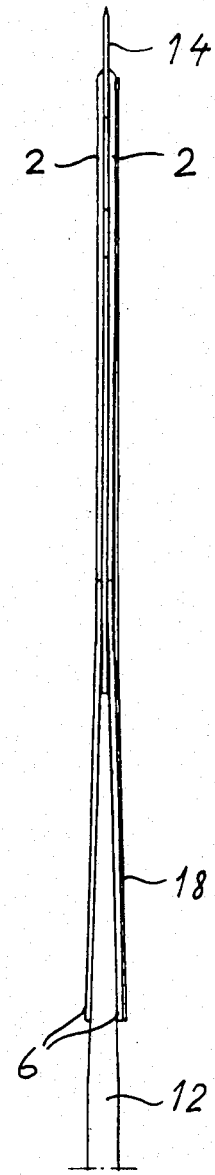
FIG.1g  FIG.1gg

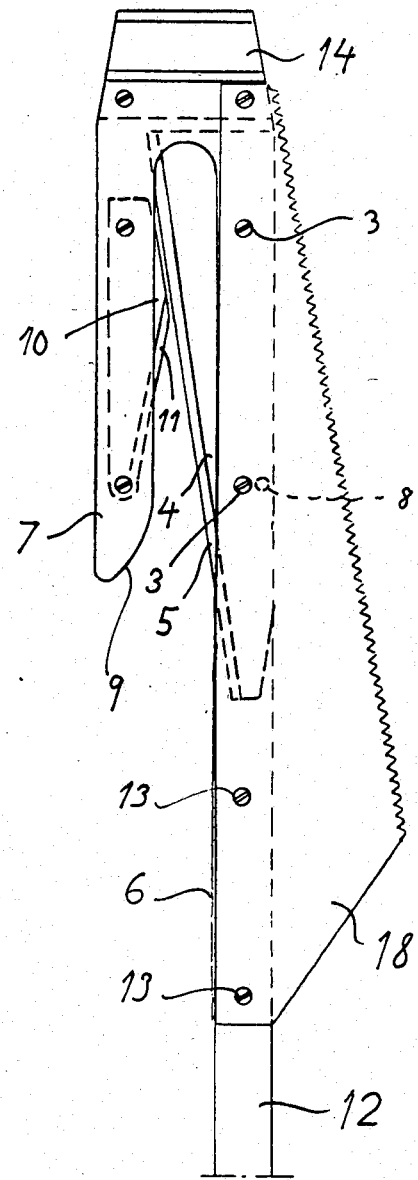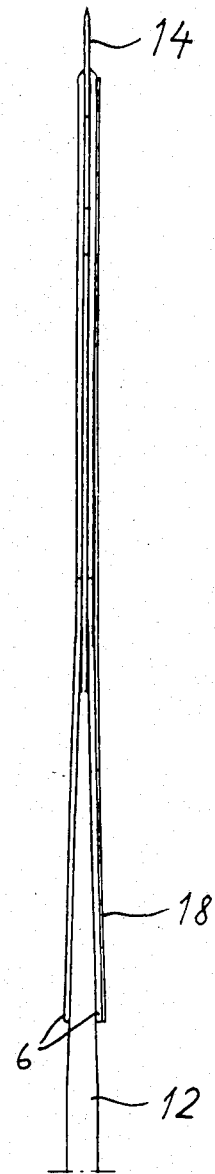
FIG.Ih    FIG.hh

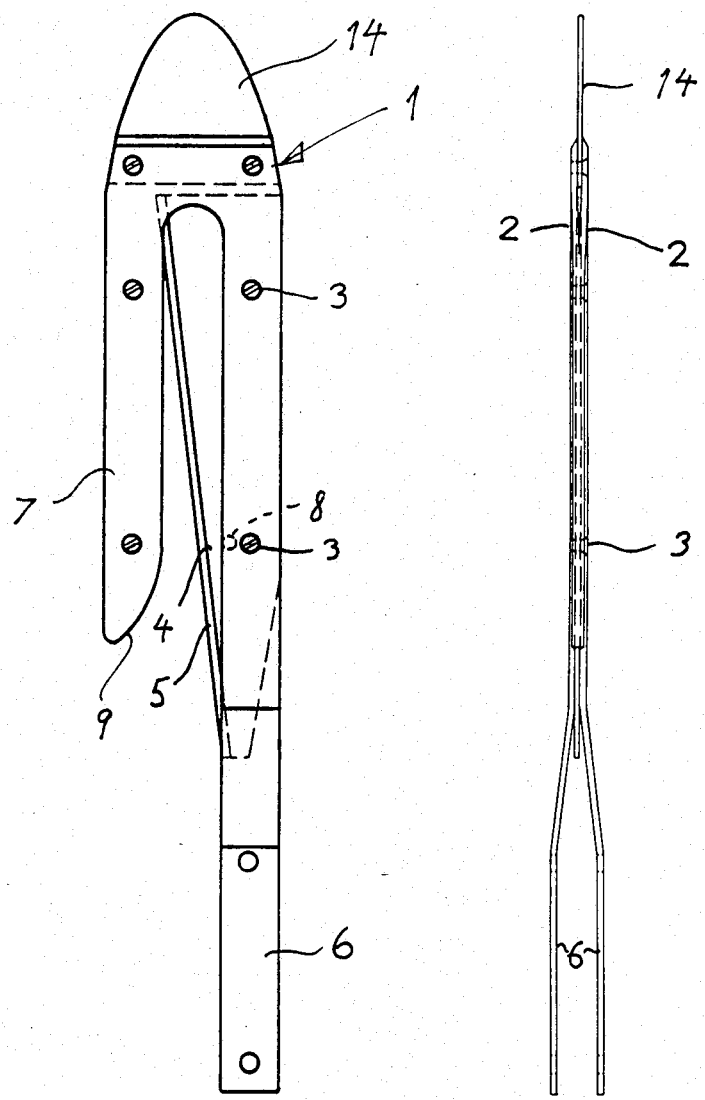

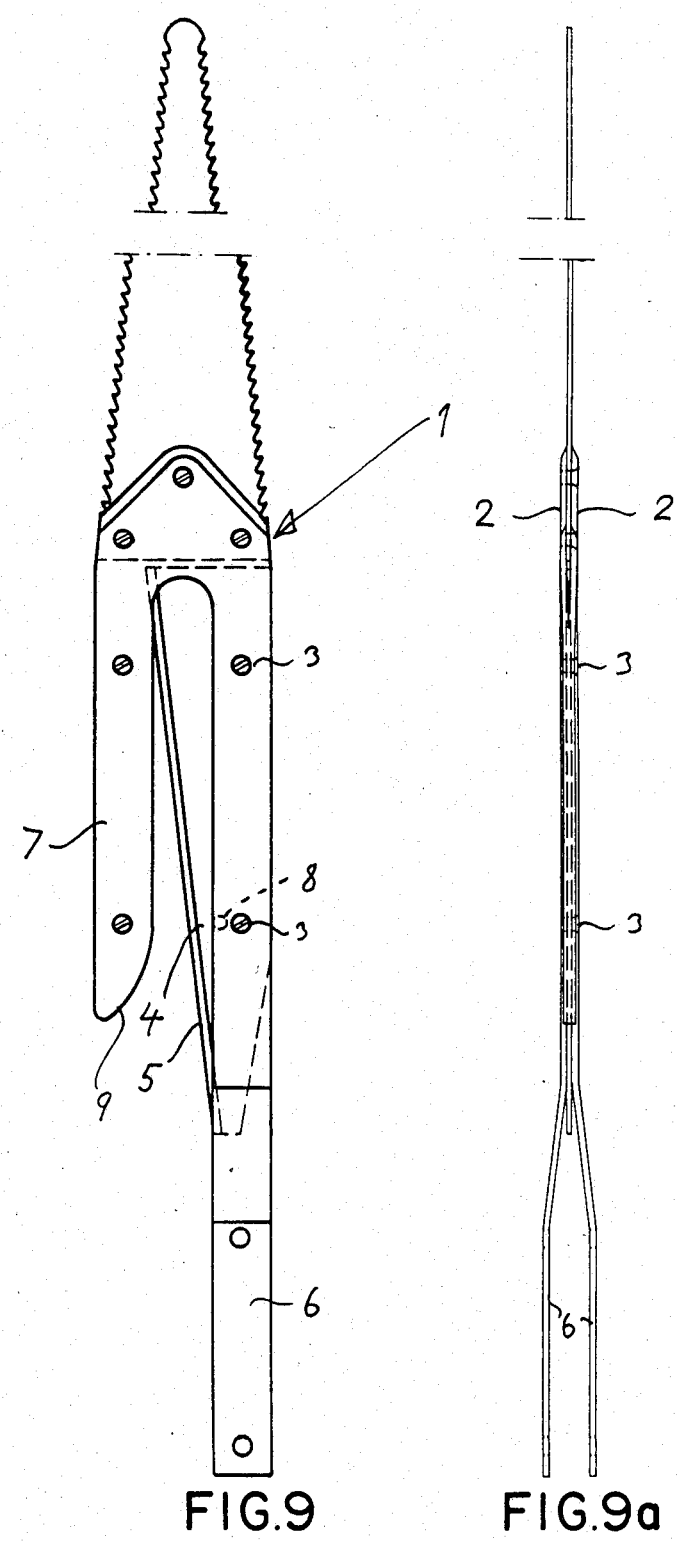

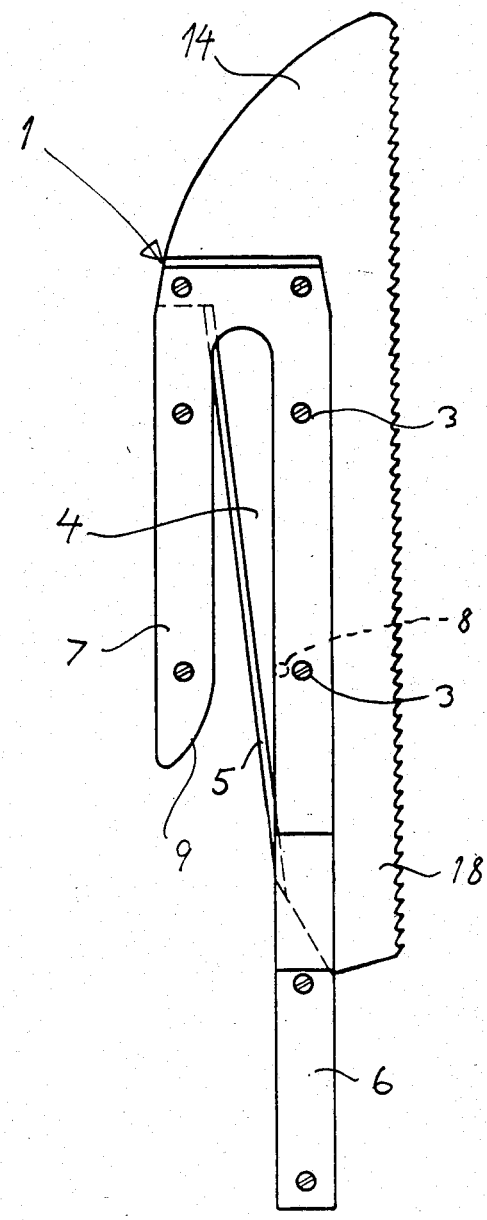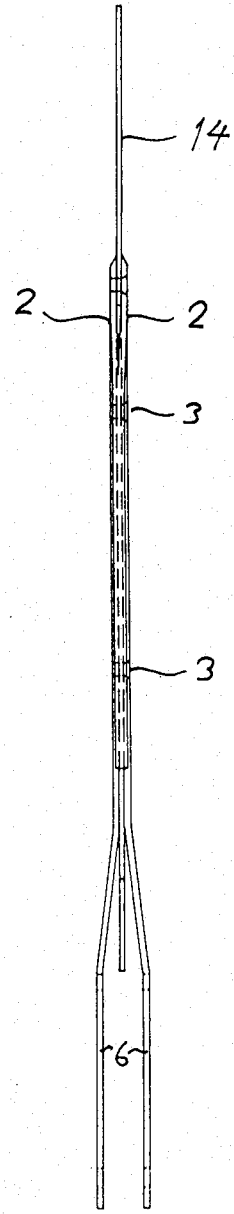

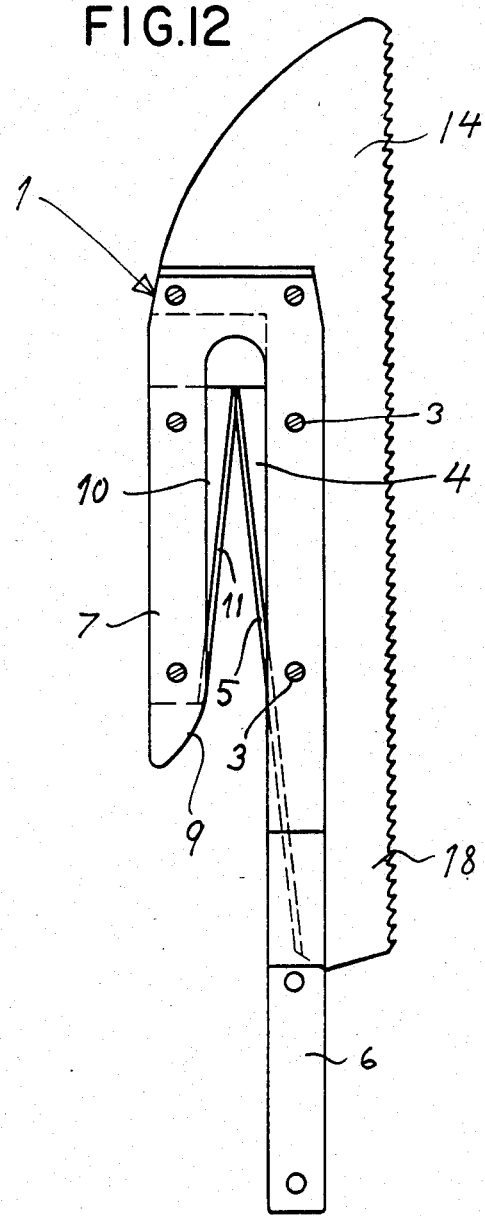

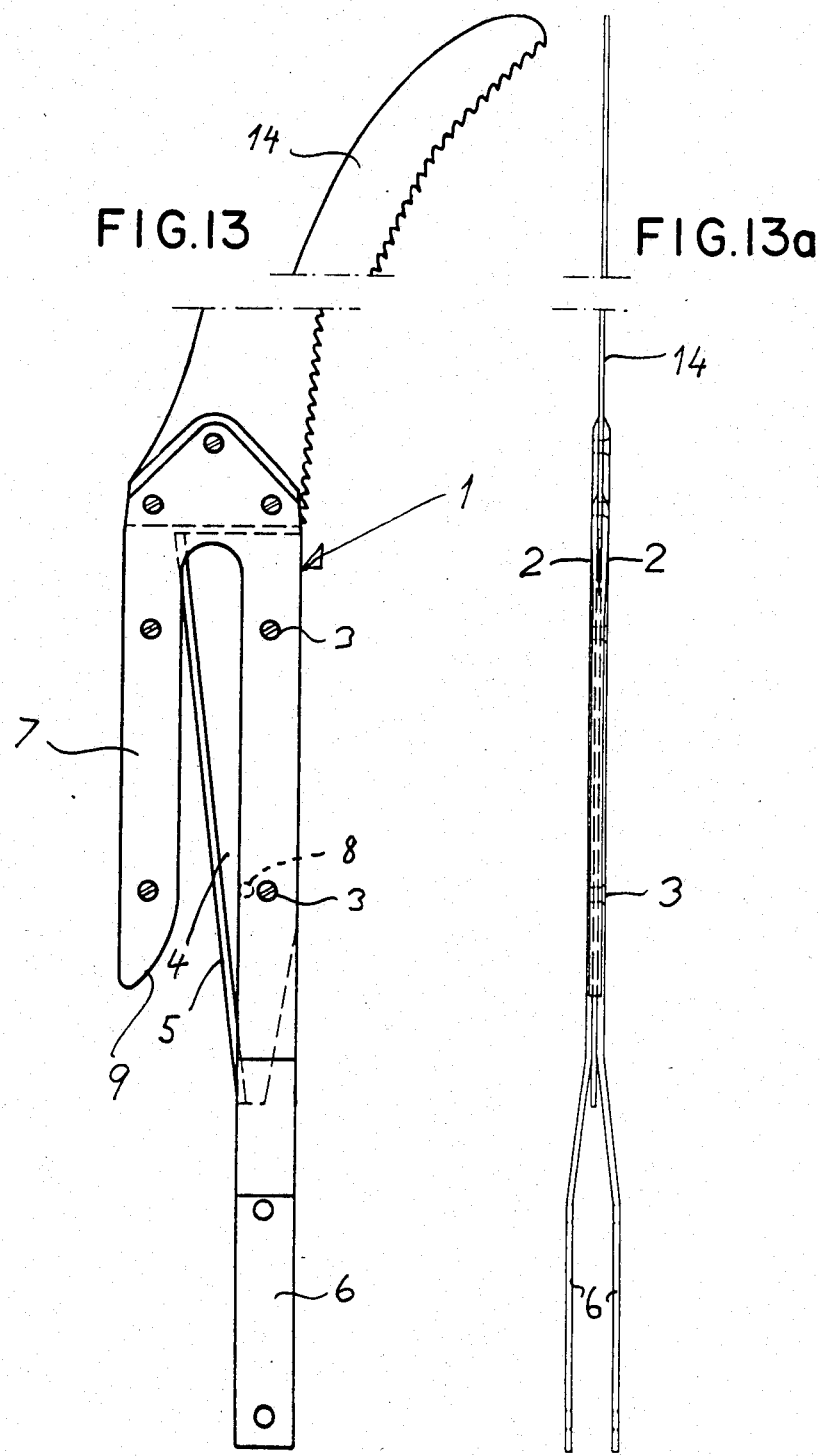

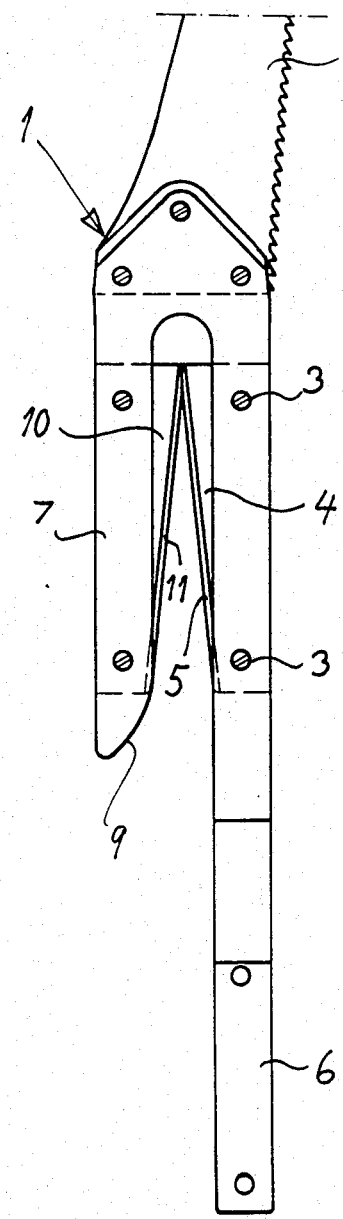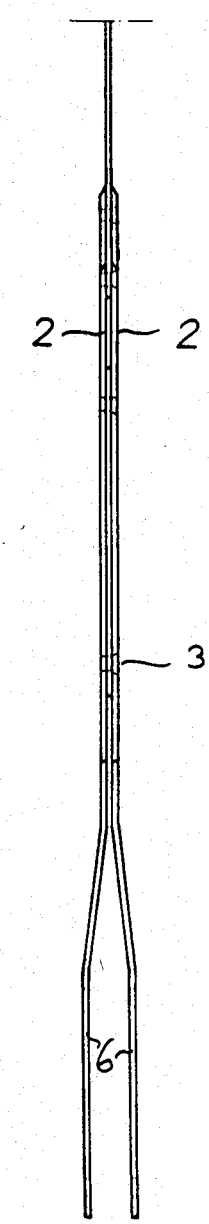

FIG.18
FIG.19
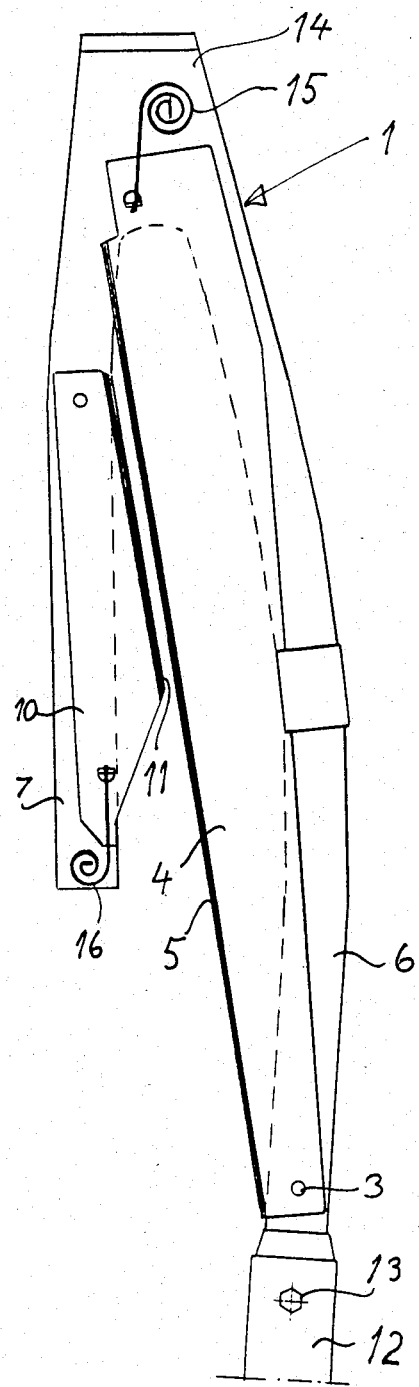
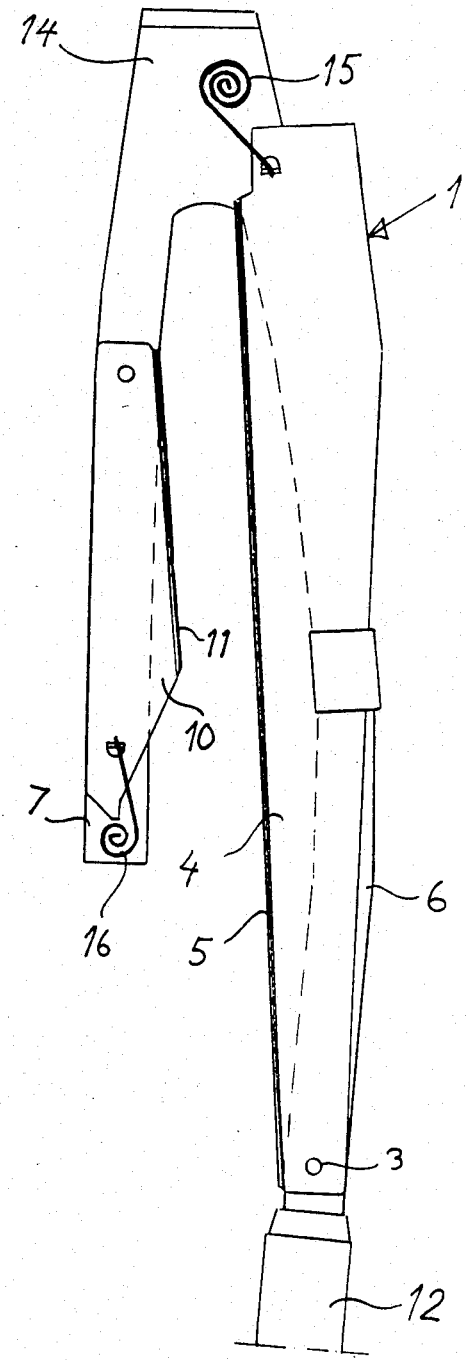

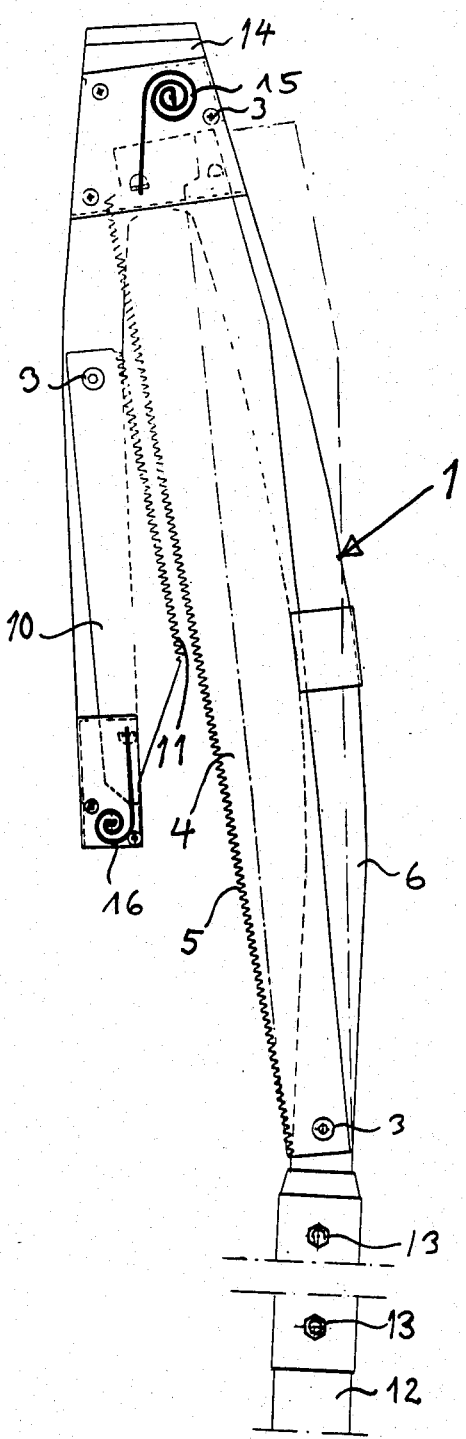

CUTTING TOOLS

The present invention relates to a cutting tool intended for pruning branches, wood plants and bushes and including a tool body which carries one or more cutting blades, saw blades or the like and means for attaching the body to a handle.

Tools of this kind are known to the art, one example hereof being conventional pruning shears, with which a cutting blade is pivotally connected to a shaft section in a manner to produce a scissor action.

One disadvantage with such tools, however, is that their cutting power is often inadequate, even when incorporating a lever-arm effect. In addition, such tools are difficult to manipulate, since they are often seated on the end of a long handle, which is difficult or impossible to hold with one hand while operating the tool itself with the other hand, with the aid of a cord or wire extending from the tool head for example. Such tools also comprise a multiple of parts and readily become inoperative, in addition to incurring relatively heavy expenses in manufacture, operation and maintenance etc..

Consequently, the object of the invention is to provide an improved, multi-purpose cutting tool which although based on a simple concept will function satisfactorily and which can be produced, maintained, assembled and dismantled at low total costs.

This object is achieved in accordance with the invention by means of a tool of the kind described in the introduction having the characterizing features set forth in Claim 1.

Further features of the invention and advantages afforded thereby will be apparent from the following description made with reference to the accompanying drawings.

FIGS. 1a–16 and FIGS. 20 and 21 illustrate various embodiments of a cutting tool according to the invention in side view and front view.

FIG. 18 illustrates the same embodiment as FIG. 17 but with some covering plates removed, and FIG. 19 illustrates the same embodiment as FIG. 18 although in a loaded condition, i.e. illustrates the positions of the cutting means when severing a branch or the like.

Figure 1A:
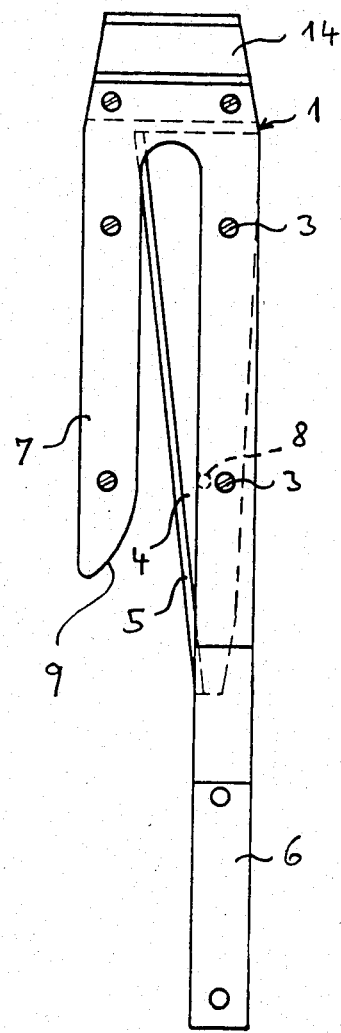

FIG. 1a illustrates a body 1 for a cutting tool according to the invention which is intended for pruning or cutting branches, wood plants and bushes and which comprises two inverted J-shaped sections 2, which are joined together by means of transverse screws or like fasteners 3. Held between the two sections is a cutting blade 4 having a cutting edge 5 which extends obliquely between the two legs 6,7 of the J-section. In this regard the cutting blade is provided with at least two through-passing holes 8, and optionally with a larger number of such holes. The screws or like fasteners 3 pass through selected ones of these holes, thereby to ensure that the cutting blade is held firmly in position, the positions of the holes being such as to enable the cutting blade to be oriented in various cutting angles.

The two leg portions of the J-sections preferably extend approximately parallel with one another, wherewith the free end of a shorter one of said leg portions, i.e. the leg 7, is terminated with an obliquely outwardly directed rounded surface 9, which facilitates the insertion of branches or the like.

The upper end portion of respective J-body sections may advantageously enclose therebetween a further cutting blade 14, this cutting blade being provided with a cutting edge which preferably extends at right angles to the longitudinal axis of the J-section. This cutting edge 14 is intended for other purposes than those for which the firstmentioned edge 5 is intended.

The various cutting angles made possible by the differing locations of holes 3 can be clearly seen when comparing FIGS. 1a and 1b. FIGS. 1a and 1b illustrate a basic design of the invention, and modifications to and supplementary arrangements with this basic design will be described in more detail hereinafter. In this respect, FIGS. 1c–1h illustrate embodiments which closely conform with the basic design, while FIGS. 2–21 illustrate embodiments which deviate to a large extent from this basic design.

The free ends of the longer J-sections 6 are preferably spaced apart so as to be able to accommodate therebetween a handle or like means 12. The handle is secured to the tool body 1 in any suitable known manner, for example by bolts or the like. The ends of the longer J-sections are provided with holes for this purpose.

A tool of this kind is very easy to use. For example, branches are severed by placing the free end of the longer J-section on one side of a branch while pulling downwardly in conjunction therewith, whereupon the branch or the like enters the space between the cutting edge 5 of the first-mentioned cutting blade 4 and the shorter J-section 7 of the tool body, so as to sever the branch. Since this pulling movement is preferably carried out extremely rapidly, the pruning operation is effected practically immediately. The speed at which pruning is effected affords important advantages, since the user has the cutting force practically in his own hands, which is totally impossible with a scissor-action tool, since neither the speed nor the power can be utilized in a comparable fashion. In addition, the user of the tool according to the invention is not impeded by other secondary operating manouvers, but can grip the handle of the tool with both hands, so as to enable the tool to be used to the best advantage and in the simplest of manners.

The cutting edge on the second cutting blade 14 is preferably used solely for an impact movement, so that one such simple tool can be used for several different tasks.

Figures 2, 2A:
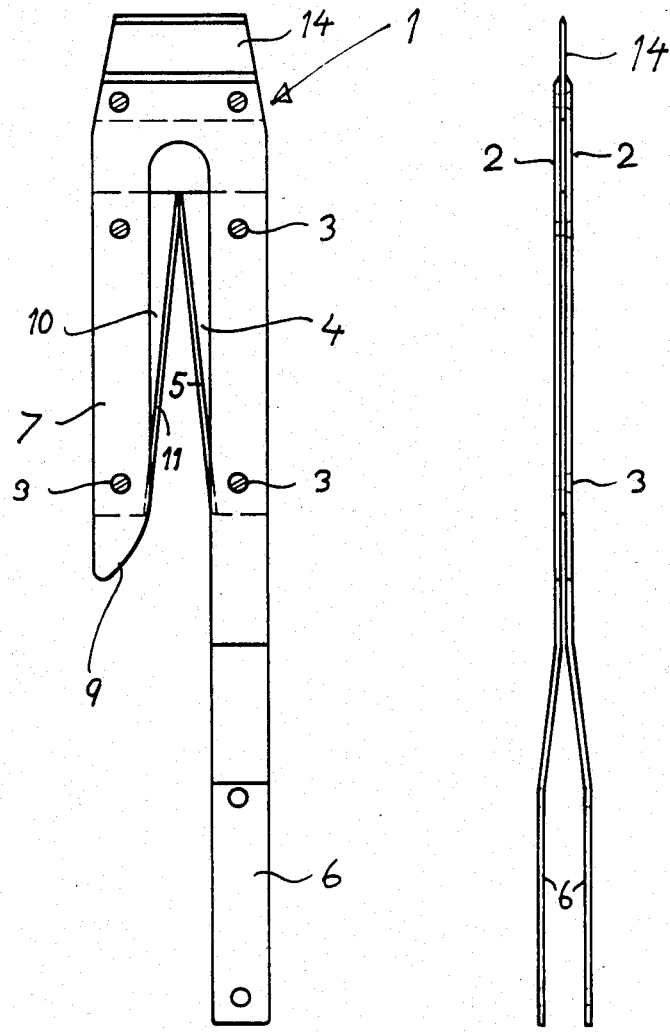

The versatility in design and use of the invention will be apparent from the further embodiments, of which FIG. 2 illustrates a V-shaped main cutting blade, which advantageously comprises two cutting blades 4,10. This embodiment provides a better cutting effect at but slightly higher cost.

FIG. 3 illustrates an embodiment of the invention provided with a parabola-shaped cutting blade 14 at said end part of the J-sections. This further cutting blade may be blunt or provided with a cutting edge, as desired.

Figures 4, 4A:
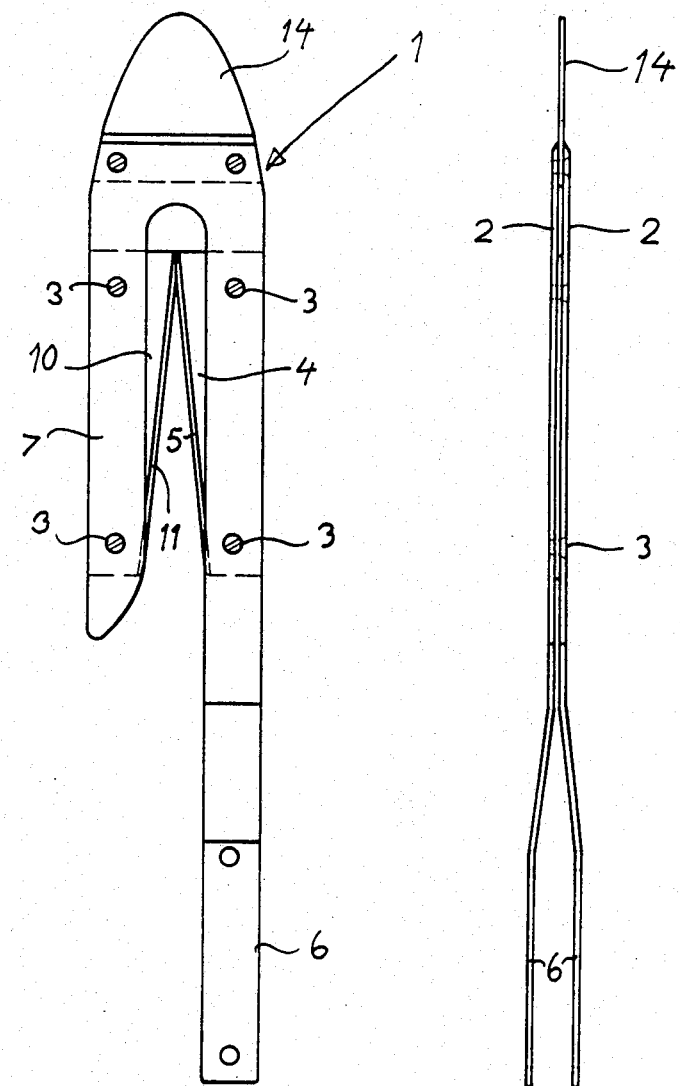

FIG. 4 illustrates a combination of the embodiments according to FIGS. 2 and 3.

Figures 5, 5A:
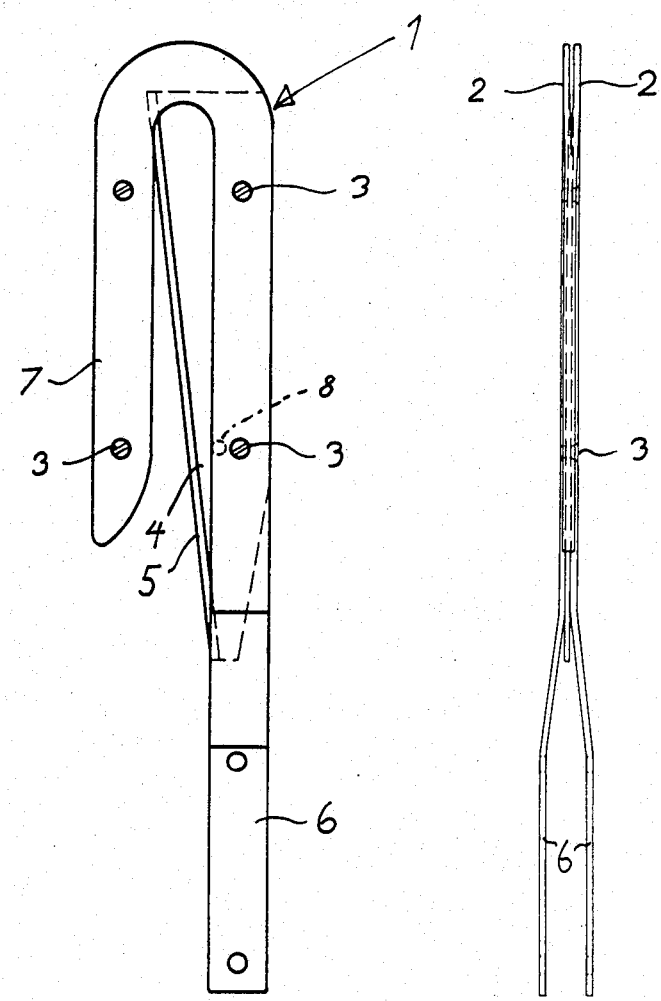

FIG. 5 illustrates an embodiment similar to the embodiment of FIG. 1a, but with the further cutting blade omitted and replaced with a simple rounding of the said end of the two J-sections.

Figure 1A:
Figures 6, 6A:
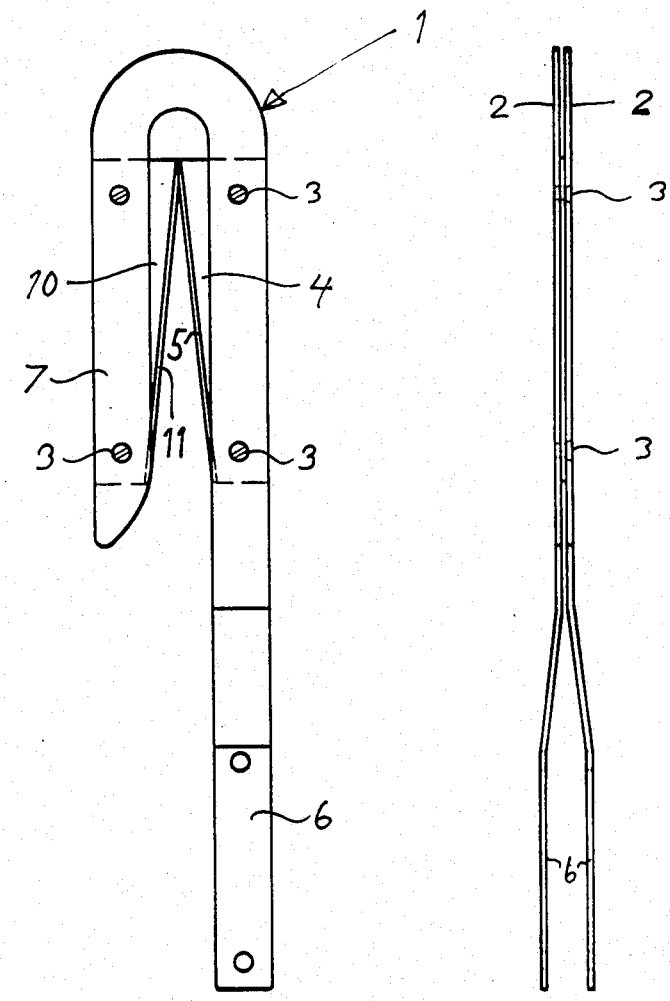

FIG. 6 illustrates a tool similar to that of FIG. 1, but provided with a double cutting blade 4,10 having cutting edges 5,11.

Figures 7, 7A:
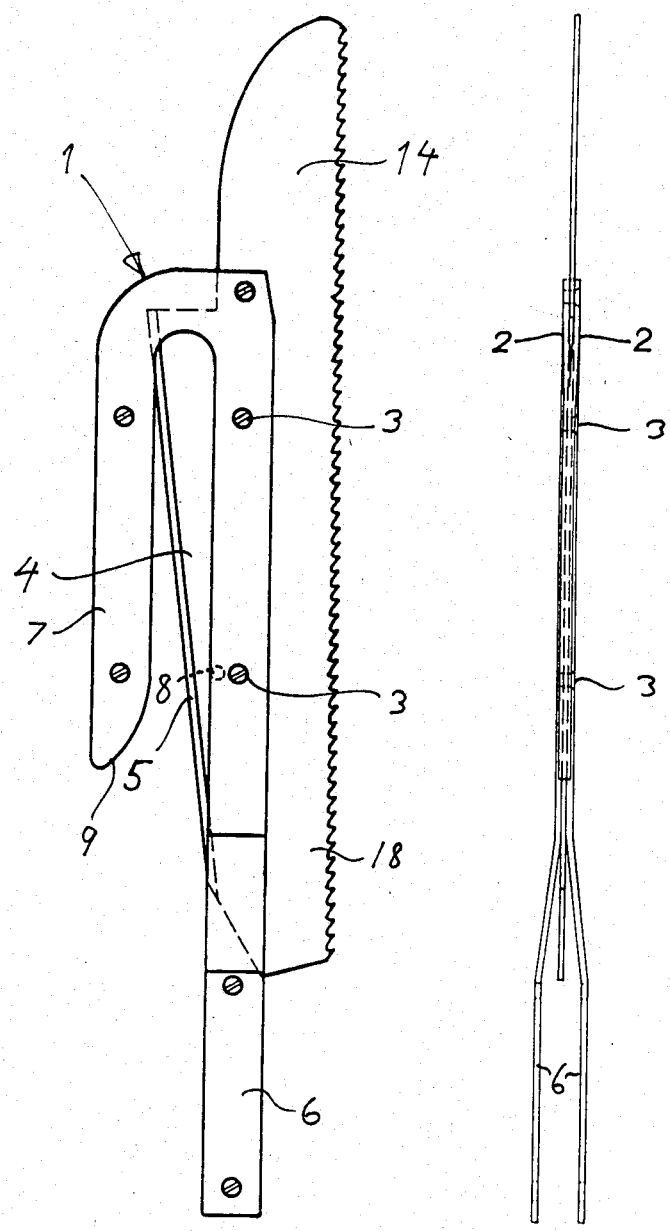

FIG. 7 illustrates an embodiment similar to that shown in FIG. 5, in which there is arranged along the outside of the longer J-section 6 an outwardly projecting saw blade 14', 18 which can be used to great advantage in practice.

Figure 8:
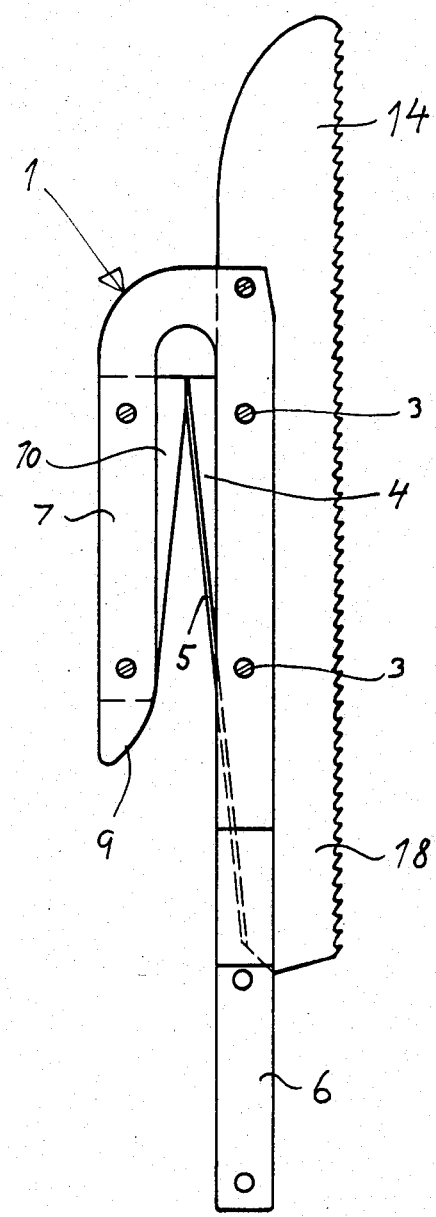
Figure 8A:
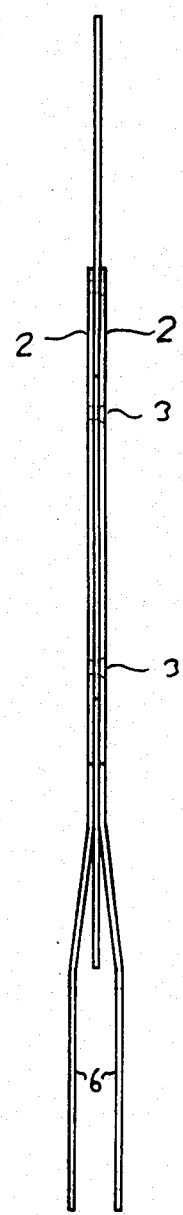

FIG. 8 illustrates an embodiment of the tool similar to that shown in FIG. 7, with which the cutting blade has the form of a V-shaped main cutting blade 4,10. The one cutting blade 10 may be left blunt, as illustrated in the Figure, and then serves solely as an anvil surface or counterpressure surface.

FIG. 9 illustrates an embodiment incorporating a saw blade 14' which extends from the said one end of the J-sections in the direction of their longitudinal axes, the saw blade 14' being clamped between the J-sections similar to the aforementioned cutting blades 14.

Figures 10, 10A:
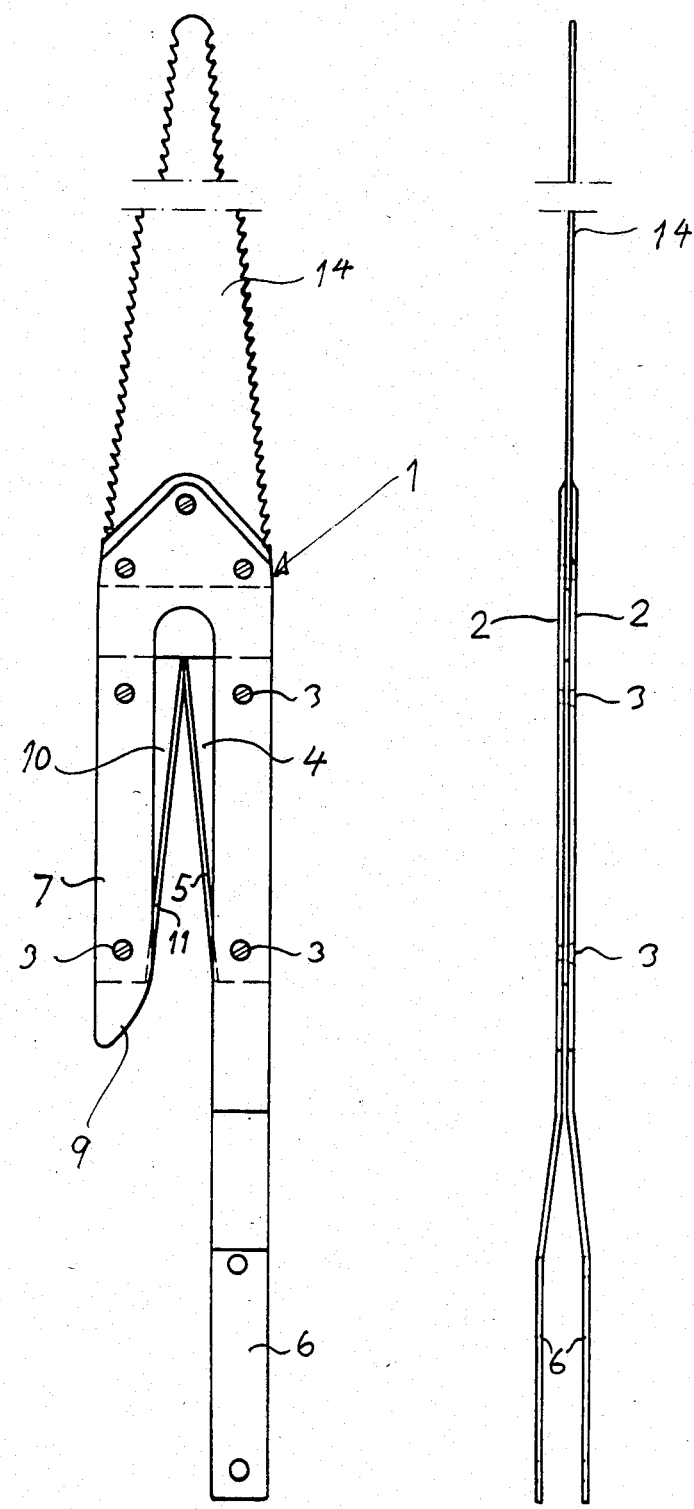

FIG. 10 illustrates an embodiment similar to the FIG. 9 embodiment, although provided with a double cutting blade 4,10.

FIG. 11 illustrates a further embodiment of the saw blade 14', 18, in which the backside of the saw blade merges with the shorter J-leg section 7, thereby providing a functional shape which obviates the risk of the tool hooking fast when in use.

FIG. 12 illustrates an embodiment similar to that shown in FIG. 11, but incorporating a double cutting blade 4,10.

FIG. 13 illustrates a device according to the invention similar to that shown in FIG. 9, although provided with a curved saw blade 14' solely provided with teeth on one thereof.

FIG. 14 illustrates an embodiment similar to that shown in FIG. 13 but provided with V-shaped cutting blades 4,10.

Figure 15:
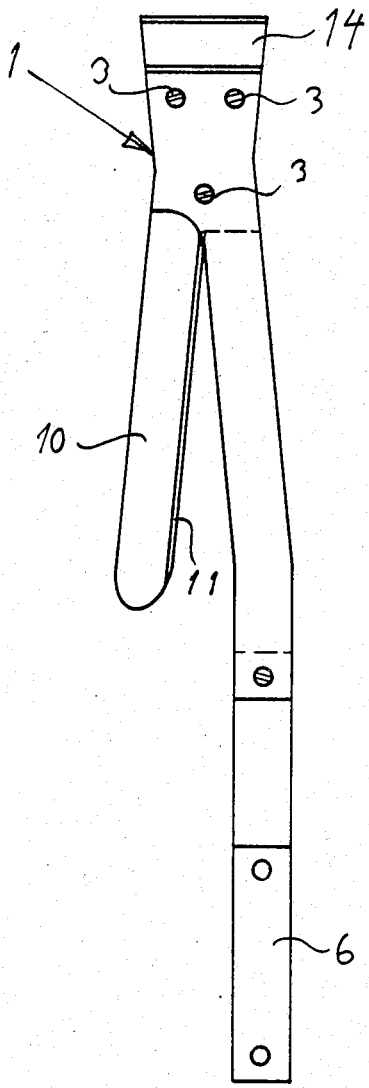
Figure 15A:
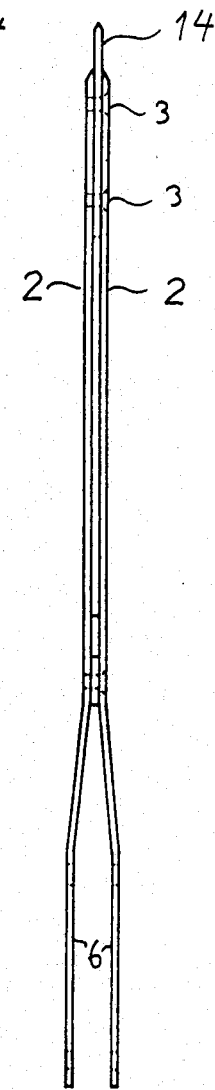

FIG. 15 illustrates an embodiment in which the two J-section legs do not extend parallel with one another, but form an acute angle therebetween. According to this embodiment, the shorter J-leg section is formed integrally with the cutting blade and comprises solely an outwardly projecting cutting blade 10 provided with a cutting edge 11. In this embodiment, the cutting blade 10 may in itself form the main cutting blade while the long leg section 6 of the tool forms the anvil surface. The long leg section 6 may also be provided with a terminal cutting blade 4.

In the embodiment illustrated in FIG. 1c the shorter J-leg section is provided in the vicinity of the cutting angle with a separate counterpart to the cutting edge, more specifically a cylindrical knife 17 journalled on a transverse securing bolt. The journal side of the knife 17 faces away from the opening on the J-leg section, this arrangement being such that an object to be cut or severed rotates the cylindrical knife or the like against the longitudinally extending knife 4 so as to provide a still better cutting effect.

In the embodiment illustrated in FIG. 1d there is mounted between the short J-leg sections 7 of the tool body a preferably non-pivotable elongated knife 10 which extends at a slight angle towards the bottom of the J-leg section, such that the two elongated knives 4,10 form a V-shape. In this way there is left a preferably through-passing gap between the two knives 4,10, wherewith only the saw blade 4 between the two longer J-leg sections 6 presents a cutting edge 5 along said gap.

The embodiment according to FIG. 1e is similar to that shown in FIG. 1a, with the difference that extending along the outside of the J-leg sections 6 is a saw blade 18 which is preferably of angular configuration, for example having a serrated edge extending approximately parallel with the oblique cutting edge 5.

Figure 1F:
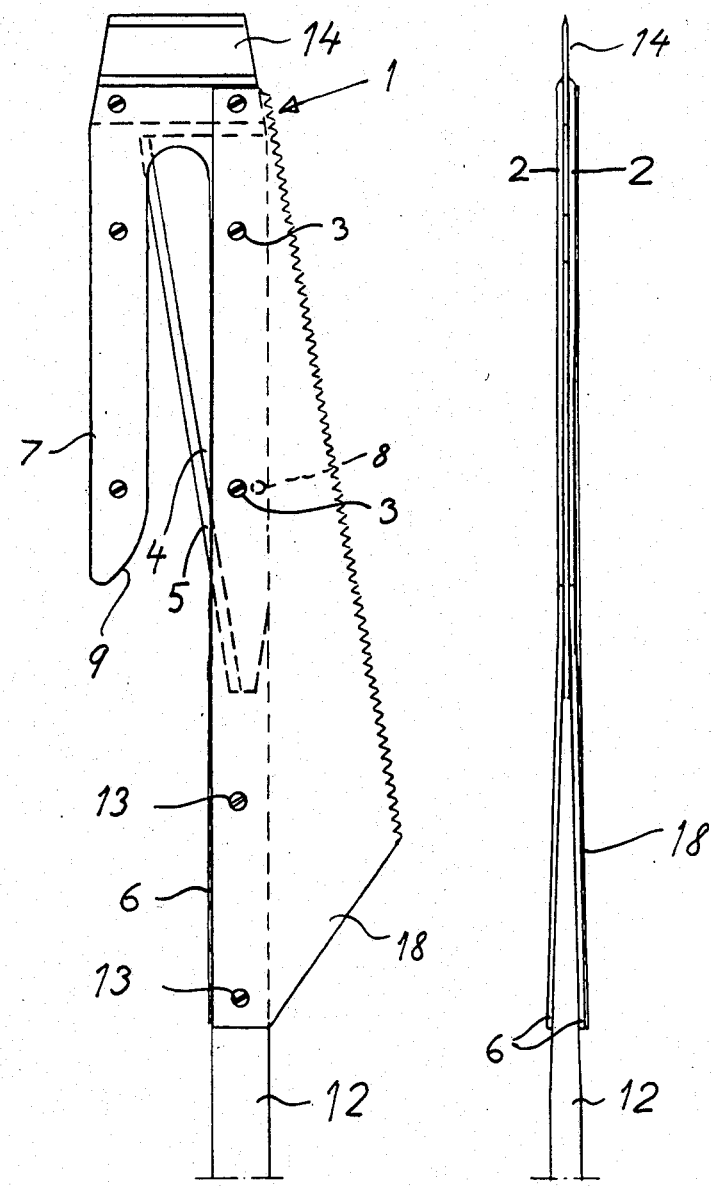

The embodiments illustrates in FIGS. 1f-1h are similar to the embodiments shown in FIGS. 1b-1d, with the exception that they are provided with a saw blade 18 as described above.

Figure 16:
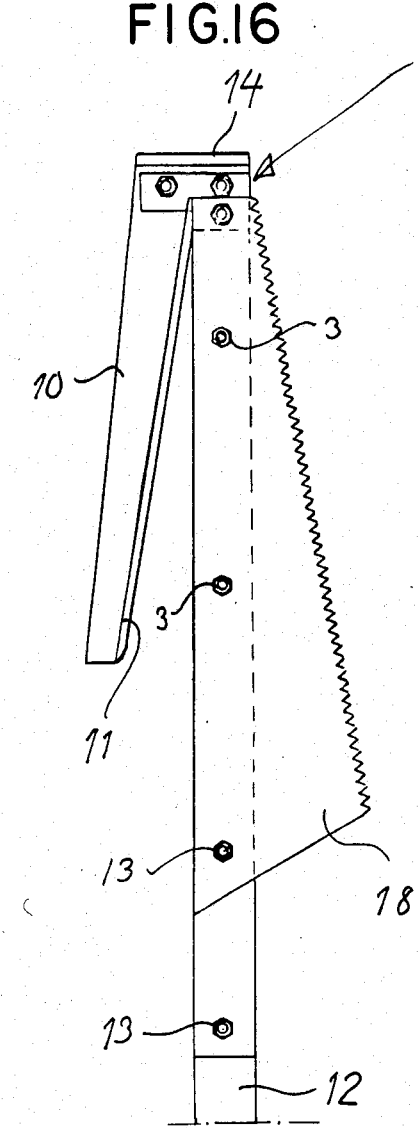
Figure 16A:
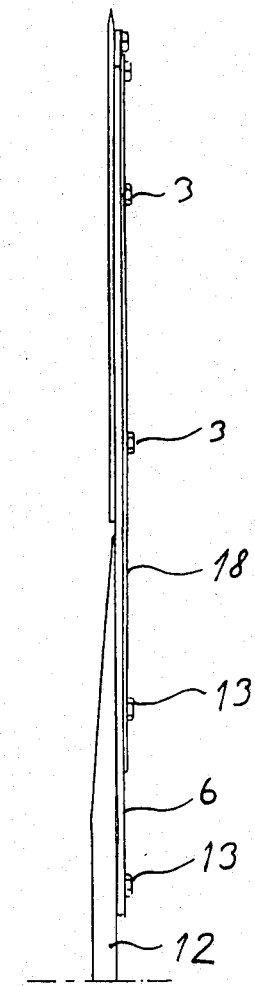
Figure 17:
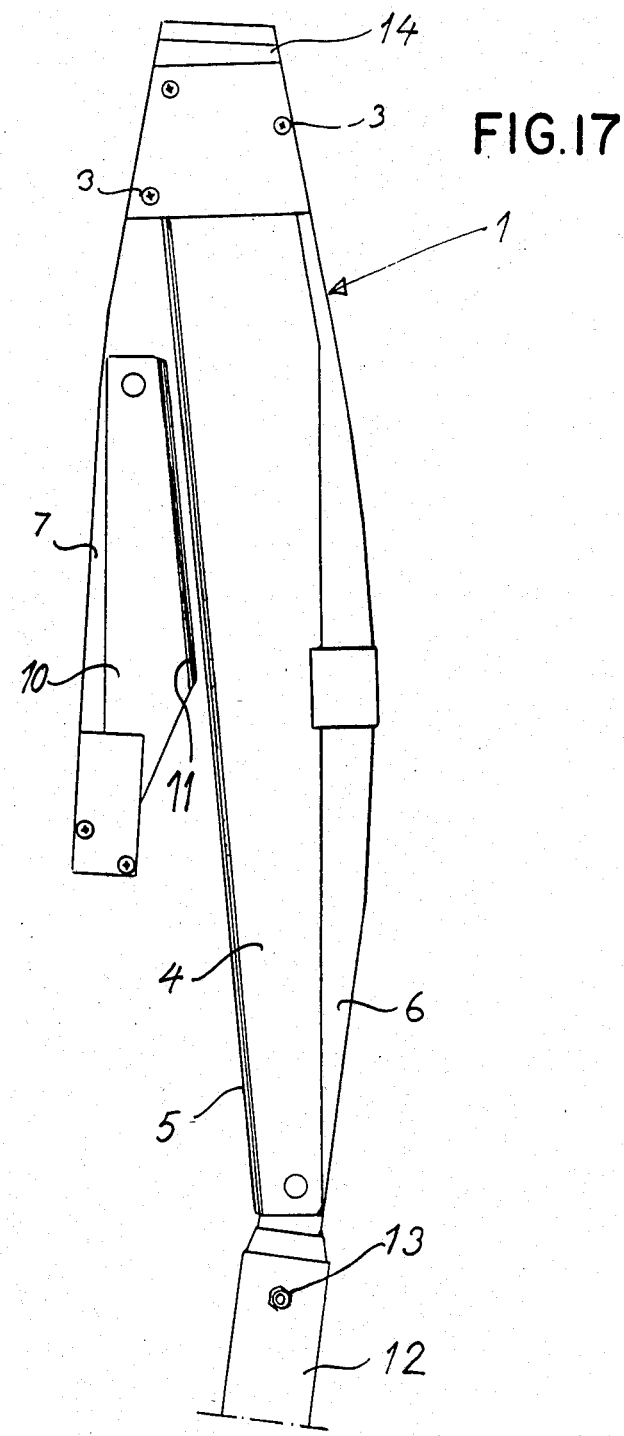
FIG. 17 is a side view of a further embodiment.

FIG. 16 illustrates an embodiment similar to that shown in FIG. 1e, but with the exception that the main cutting blade 10 is arranged along the shorter J-leg section 7. This cutting blade 10 may optionally form an integral part of the shorter J-leg section.

FIGS. 17, 18, 19, 20 and 21 illustrate an extremely advantageous further development of the aforedescribed embodiments, more specifically each of the two J-leg sections 6,7 is provided with a cutting blade 4,10 and/or a saw blade 4',10'. In this development of the aforesaid embodiments at least one of the two blades, preferably both blades, is pivotally journalled at one end thereof, such as to permit said blade or blades to be rotated, while the other end of said blades is biassed by means of springs 15,16. In this way a branch or the like can be subjected to a cutting or sawing motion from two opposing sides, thereby enabling the branch to be severed more rapidly without being impeded by bark stripped from the branch in the proximity of the cutting location. Thick branches and slender trees can also be cut or pruned with the aid of such a tool, since the branch is not severed in a single cutting movement, but that the cutting tool can be advantageously moved backwards and forwards. In addition, during the sawing or cutting operation the two cutting edges 5,11 and 5',11' respectively constantly displace their working line, due to the unilateral pivoting motion in the circumferential direction of the object being cut, which must undoubtedly be considered an advantage. Alternatively, as will be understood, both the cutting blade and the saw blade may be arranged for displacement along the whole of their length, and thus activated at both ends by means of springs 15,16 for example. The saw blade or the like can be journalled in a single plane or in to different planes, i.e. planeparallel planes. The arrangement may also be such as to provide a through-passing gap in the unloaded state of the tool, particularly in the firstmentioned case.

As will be understood, the device according to the invention may include a curved cutting blade 4,10, saw blade 4',10' or the like on at least one side thereof.

The aforedescribed and illustrated embodiments shall only be considered to represent non-descriptive embodiments which can be modified or enlarged upon within the scope of the concept of the invention as defined in the following claim.

I claim:

1. A cutting tool for cutting or pruning branches, wood plants and bushes, comprising a tool body provided with means for securing it to a handle and carrying one or more cutting blades, saw blades or the like, characterized in that the body (1) has a substantially J-shape or V-shape; and in that at least one of the cutting blades (4,10) saw blades (4',10') or the like is arranged on the inside of the body (1) or forms a part of said body in a manner such that tool body leg sections (6,7) of the body form an anvil surface against which the first mentioned cutting blade, saw blade or the like is pressed, and wherein each of the tool body leg sections (6, 7) has arranged thereon a said cutting blade (4,10) or a said saw blade (4',10'), said blades in an unloaded condition extending substantially parallel with one another, wherewith one of the mutually remote ends of the two blades is pivotally journalled and the other ends are biassed by springs (15,16).

* * * * *